Patented Sept. 29, 1931

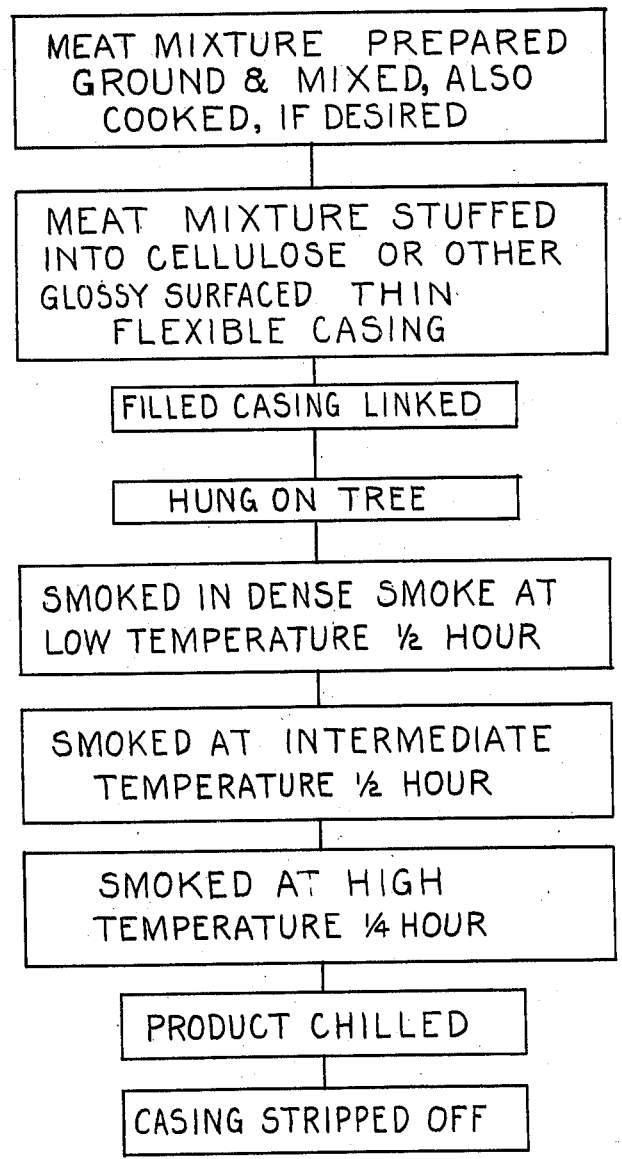

1,825,528

UNITED STATES PATENT OFFICE

FRITZ W. KNUDSEN, OF WASHINGTON, DISTRICT OF COLUMBIA, ASSIGNOR TO ANDREW D. LOFFLER, JR., OF WASHINGTON, DISTRICT OF COLUMBIA

METHOD OF PRODUCING SKINLESS SAUSAGE

Application filed April 3, 1929. Serial No. 352,133.

The invention has for an object to enable the successful production of skinless Frankfurter sausages and the like, by forming the sausage in accordance with familiar processes using casings such as shown in the Patents Nos. 1,070,776 and 1,158,400.

It is a well known fact that for a long time after the issue of the last mentioned patent it was not practicable commercially to use the cellulose casing for the production of skinless sausages owing to the fact that it was not known how to insure the proper separation of the casing from the product and secure a good finish of the product suitable for its ready marketing. It was the common experience that the casing would adhere to the sausage, and could not be stripped cleanly therefrom, resulting in the breakage of surface and formation of the product with "pock-marks" so that it would not be saleable, but required to be made over, with consequent loss, not only of the material adhering to the casings, but because the made-over product is inferior and cannot be sold at a profit.

It is therefore an object of this invention to enable the production of such sausage with ordinary equipment customarily used in the making of Frankfurters, and without requiring modification of the food mixture or any special preliminary cooking or treatment thereof. It is a further object of the invention to enable the preparation of this product in a manner to insure a good closed surface on this article, having a high, glossy finish, which adds to the attractiveness of the article commercially, as well as improving its hygienic quality by making the surface impervious to penetration of dust-particles and the like.

Additional objects, advantages and features of invention reside in the peculiar steps of the process or their coordination, and the product produced, as described hereinafter and indicated in the accompanying drawing, wherein there is presented a diagram of the steps in producing a sausage, utilizing my invention.

As is well understood in this art, ordinary Frankfurters are made by stuffing a suitable casing with the food product by the use of an extrusion device or press having a nozzle over which the casing is fitted and allowed to run as the filling is extruded, carrying the casing with it. By various methods, the filled casing is then linked and hung upon suitable trees or racks which are run into a smoke-house, where the product is smoked sufficiently to preserve it and give it a good flavor. In this common prior process, but little attention is paid to the temperature, which is ordinarily between 150 and 200 degrees Fahrenheit, throughout the smoking operation and no special variations of the smoke density and temperature at earlier and later stages in a definitely coordinated relation have been found necessary nor are they practiced.

Frankfurters using the cellulose casing may be produced by similar methods, practically the only difference involved being the use of a special nozzle on the press, especially adapted to accommodate the cellulose casing, which is of uniform diameter throughout, whereas in animal casings, they are larger at one end than at the other. The cellulose casing, therefore, requires a nozzle of cylindrical form, while the animal casing involves the use of a tapered nozzle.

It is also well known that it has long been an important desire and need in the industry to produce a satisfactory sausage having no casing thereon of a material separate from that of the food of which the product is formed, or in other words, a skinless sausage, and many attempts have been made toward this end. Due to the fact that the cellulose casing has a very polished surface and may be made waterproof, it has been appreciated that if the Frankfurter could be molded in the ordinary way in such casings and satisfactorily cured, and the casings then stripped therefrom, it would be possible to produce a skinless sausage having a fine surface and appearance embodying the desired qualities. Prior to my invention attempts had been made to produce the skinless sausage by this method, but as before explained, without success, owing to the fact that it was not possible to remove the casing without damaging the sausage in many instances, and for that reason, skinless sausage produced with the use of cellulose casings were not being produced in a sustained manner. It is understood that skinless sausage had been occasionally cured in cellulose casings, before, but after a good product had been made from one batch of stock, another would have casings adhering so to the stock as to damage the product.

In accordance with my invention, the food batch is made up in accordance with known practices, and my invention is especially suitable for use in the production of the better grades of Frankfurters. The meat stock is prepared as usual, and by means of a suitable press is extruded through a familiar form of nozzle into the cellulose casing. It is then linked by any familiar method and hung upon the sausage tree preparatory to curing, and the tree moved into the smokehouse where it is positioned in the usual way and the smokehouse closed preparatory to smoking treatment. Up to this time all the steps taken may accord with familiar practices, and may be varied in accordance with discretionary changes which are dictated by the need of various establishments or the product desired. The rack carrying the sausages being properly positioned and the smoke-house closed, the fire may be made from such materials as ordinarily employed, and in case sawdust is used, after the fire is initially prepared so as to operate to produce a moderate temperature in the smoke-house, a certain amount of dampened dust is added, so as to produce a very dense smoke initially, accompanied by a very low temperature compared to that ordinarily employed in sausage curing.

The fire should be sprinkled with water if the heat tends to rise above the maximum as set below:

A temperature of not more than 120 degrees Fahrenheit is maintained for the first half hour of curing, and it is then raised for a second half hour to at between 130 and 140 degrees. Finally, the temperature is maintained at between 180 and 200 degrees to effect the final cooking and curing effect to the extent desired. These periods of time are of course subject to some variation in accordance with weather conditions as is well understood in the art, it being customarily necessary to increase the temperature or extend the period of curing in damp or rainy weather.

It is quite important, however, that the first period of treatment should be at a low temperature, and that it should be accompanied by a dense smoke, in order to secure the fixing of the surface material of the food body next to the cellulose casing in a dense mass, adapted to provide a good closed surface on the finished article, and also whereby it will not become joined to the casing without possibility of detachment.

Upon completion of the curing as described, the product is removed and chilled as usual, and is then manipulated or treated for removal of the casing, which is usually done by hand, the workmen splitting the casing at one end and pulling from the filling spirally.

In the production of the cellulose casing, it is usually supplied commercially in lengths of approximately 35 feet, and it is customary to handle the sausages in units each comprising one of these lengths of casing, throughout the various steps of the process where manipulation of the product is required.

My method has been demonstrated over a sufficient period to show that it is highly satisfactory in producing uniformly a high quality of surface finish and good appearance in the skinless sausage, and is readily carried into effect by persons of ordinary experience in sausage making, without structural alterations of equipment of any kind.

As a result of my invention, skinless sausage is now being produced on a large scale, using the cellulose casing.

After the first half hour treatment as indicated, the remaining treatment may be modified from that described by a progressive raising of the temperature, although the results may be made more certain by regulation to near the limits and time as indicated.

In case a wood fire is employed, the fire requires to be more amply sprinkled with water in the early stages than would be customary, and the fire then not allowed to attain the normal heat that would be employed in curing ordinary Frankfurters until after the period indicated.

I claim:

1. The steps in producing a skinless sausage consisting in stuffing a flexible waterproof casing with a meat stock, linking the encased product, curing the encased product in a dense smoke at a temperature not exceeding 120° for a substantial period to condense the surface of the sausage to prevent adhesion of the casing thereto, then increasing the temperature to a normal stage corresponding to the ordinary prior curing practice and finally stripping the casing from the sausage.

2. The steps in producing a skinless smoked product consisting in stuffing a cellulose casing with a meat stock, curing the encased product in a dense smoke at a temperature of approximately 120° for a substantial period to condense the surface of said stock to prevent adhesion of the casing thereto, then increasing the temperature to a normal stage corresponding to the ordinary prior curing practice and finally stripping the casing from the cured product.

3. The steps in producing a skinless sausage consisting in stuffing a cellulose casing with a meat stock, initially curing the encased product for a period of approximately one-half hour in a dense smoke atmosphere and in a temperature of about 120°, thereby condensing the surface of the meat stock to prevent adhesion of the casing thereto, continuing the curing at a higher temperature for a similar period, then completing the curing in a temperature of 180° to 200° and finally stripping the casing from the cured product.

4. The steps in producing a skinless product consisting in stuffing a flexible casing with a meat stock, then subjecting the encased product for a substantial period to a heated temperature sufficiently low to initially form an incrustation on the surface of the product to prevent adhesion of the casing thereto, then increasing the temperature to complete the treatment of the meat stock and finally stripping the casing from the incrusted surface of said product.

5. The steps in producing a skinless product consisting in stuffing a flexible casing with a meat stock, then subjecting the encased product for a substantial period to a heated temperature sufficiently low to initially form an incrustation on the surface of the product to prevent adhesion of the casing thereto, then increasing the temperature to complete the treatment of the meat stock, then chilling the encased product and finally stripping the casing from the incrusted surface of said product.

6. The steps in producing a meat product consisting in stuffing a flexible casing with a meat stock, then subjecting the encased product to a heated temperature sufficiently low to initially form an incrustation on the surface of the product to prevent adhesion of the casing thereto, then increasing the temperature to complete the treatment of the meat stock so that the casing may be removed without affecting the incrusted surface of the product.

In testimony whereof I affix my signature.

FRITZ W. KNUDSEN.